US007506200B2

(12) United States Patent
Benhase et al.

(10) Patent No.: US 7,506,200 B2
(45) Date of Patent: *Mar. 17, 2009

(54) APPARATUS AND METHOD TO RECONFIGURE A STORAGE ARRAY DISPOSED IN A DATA STORAGE SYSTEM

(75) Inventors: Michael Thomas Benhase, Tucson, AZ (US); Robert Akira Kubo, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 464 days.

This patent is subject to a terminal disclaimer.

(21) Appl. No.: 11/340,078

(22) Filed: Jan. 25, 2006

(65) Prior Publication Data
US 2007/0174672 A1     Jul. 26, 2007

(51) Int. Cl.
*G06F 11/00* (2006.01)
(52) U.S. Cl. ............................................. 714/6; 714/7
(58) Field of Classification Search ....................... 714/6
See application file for complete search history.

(56) References Cited

U.S. PATENT DOCUMENTS

| 7,254,754 | B2* | 8/2007 | Hetzler et al. ............... 714/710 |
| 2003/0177324 | A1 | 9/2003 | Timpanaro-Perrotta |
| 2003/0231529 | A1* | 12/2003 | Hetrick et al. ............... 365/200 |
| 2004/0030826 | A1* | 2/2004 | Knapp, III .................. 711/112 |
| 2004/0073747 | A1 | 4/2004 | Lu |
| 2004/0123179 | A1* | 6/2004 | Dragomir-Daescu et al. ... 714/1 |
| 2004/0181641 | A1* | 9/2004 | Nguyen et al. ............... 711/162 |
| 2004/0255080 | A1 | 12/2004 | Kihara et al. |
| 2005/0060609 | A1 | 3/2005 | El-Batal et al. |
| 2005/0097390 | A1 | 5/2005 | Tanaka et al. |
| 2005/0132136 | A1 | 6/2005 | Inoue et al. |
| 2005/0144382 | A1 | 6/2005 | Schmisseur |
| 2007/0109883 | A1* | 5/2007 | Elliott et al. ................ 365/200 |
| 2007/0113006 | A1* | 5/2007 | Elliott et al. ................ 711/114 |
| 2007/0168703 | A1* | 7/2007 | Elliott et al. .................... 714/6 |
| 2007/0220318 | A1* | 9/2007 | Kalos et al. ................... 714/13 |

* cited by examiner

*Primary Examiner*—Scott T. Baderman
*Assistant Examiner*—Kamini Patel
(74) *Attorney, Agent, or Firm*—Dale F. Regelman; Quarles & Brady LLP

(57) ABSTRACT

A method is disclosed to reconfigure a storage array disposed in a data storage system. The method supplies a data storage system comprising a plurality of data storage devices, wherein each of the plurality of data storage devices is assigned to one of a plurality of data storage arrays, or is assigned as a spare device. The method then detects an unassigned data storage device, and determines if any of the plurality of data storage arrays comprises a degraded data storage array. If the method determines that any of the plurality of data storage arrays comprises a degraded data storage array, then the method determines if the unassigned data storage device can be used to restore the degraded data storage array to optimal reliability, optimal performance, and optimal efficiency. If the method determines that the unassigned data storage device can be used restore the degraded array to an array comprising optimal reliability, optimal performance, and optimal efficiency, then the method reconfigures the degraded data storage array to comprise the unassigned data storage device.

12 Claims, 10 Drawing Sheets

APPARATUS AND METHOD TO RECONFIGURE A STORAGE ARRAY DISPOSED IN A DATA STORAGE SYSTEM

FIELD OF THE INVENTION

This invention relates to an apparatus and method to reconfigure a storage array disposed in a data storage system.

BACKGROUND OF THE INVENTION

Data storage systems are used to store information provided by one or more host computer systems. Such data storage systems receive requests to write information to a plurality of data storage devices, and requests to retrieve information from that plurality of data storage devices. It is known in the art to configure the plurality of data storage devices into two or more storage arrays.

What is needed is an apparatus and method to reconfigure one or more of the storage arrays when an unassigned data storage device is detected in the data storage system.

SUMMARY OF THE INVENTION

Applicants' invention comprises a method to reconfigure a storage array disposed in a data storage system. The method supplies a data storage system comprising a plurality of data storage devices, wherein each of the plurality of data storage devices is assigned to one of a plurality of data storage arrays, or is assigned as a spare device. The method then detects an unassigned data storage device, and determines if any of the plurality of data storage arrays comprises a degraded data storage array.

If the method determines that any of the plurality of data storage arrays comprises a degraded data storage array, then the method determines if the unassigned data storage device can be used to restore the degraded data storage array to optimal reliability, optimal performance, and optimal efficiency. If the method determines that the unassigned data storage device can be used restore the degraded array to an array comprising optimal reliability, optimal performance, and optimal efficiency, then the method reconfigures the degraded data storage array to comprise the unassigned data storage device.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. The invention will be described as embodied in an data storage system which comprises two clusters, each cluster comprising a plurality of device adapters and a data cache. The following description of Applicants' method is not meant, however, to limit Applicants' invention to storage system comprising multiple clusters, as the invention herein can be generally applied to reconfiguring one or more storage arrays disposed in a data storage system.

Figure 1:
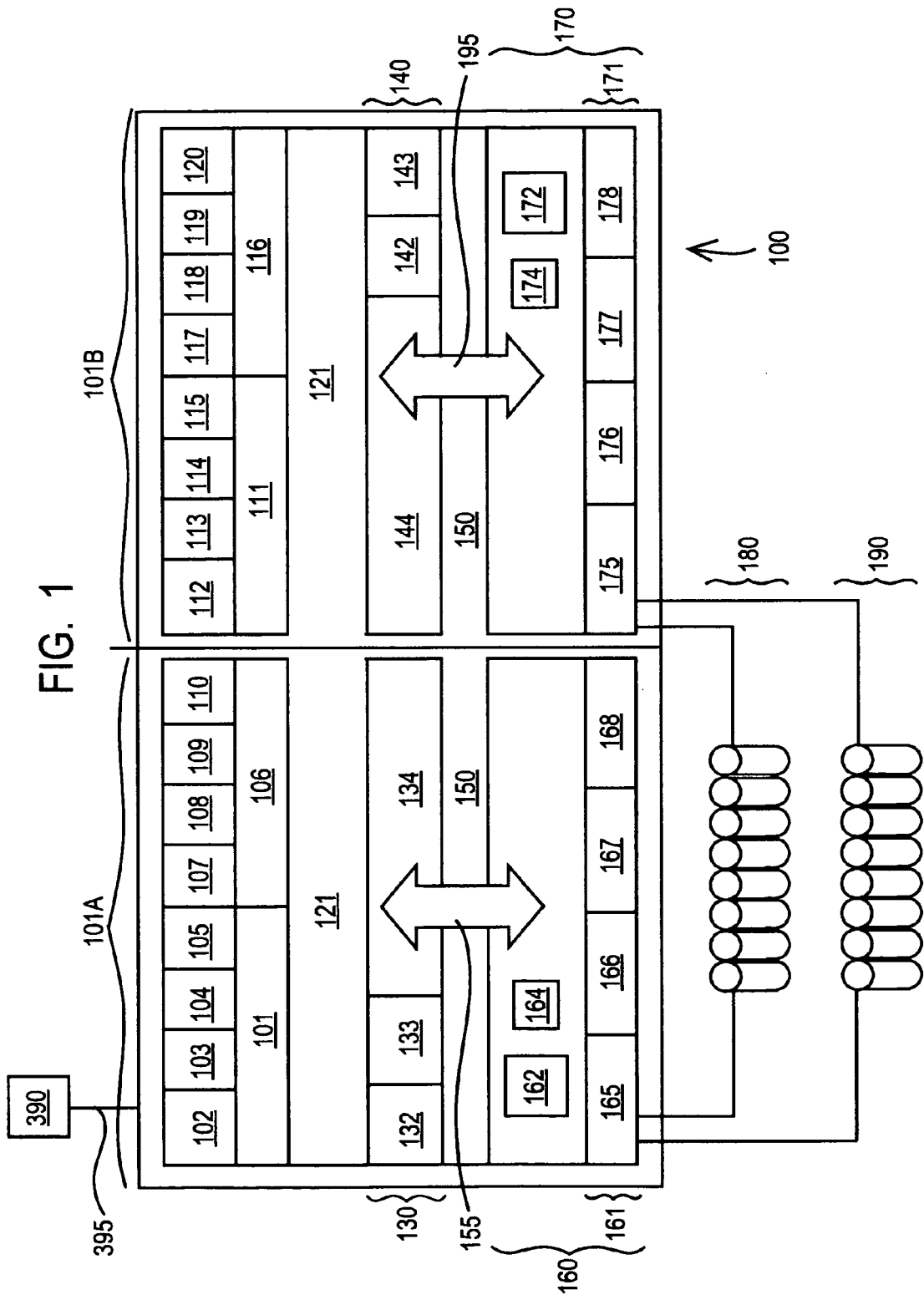
FIG. 1 is a block diagram showing one embodiment of Applicants' data storage system.

Referring now to FIG. 1, data storage system 100 is capable of communication with host computer 390 via communication link 395. The illustrated embodiment of FIG. 1 shows a single host computer. In other embodiments, Applicants' data storage system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, host computer 390 further includes a storage management program. The storage management program in the host computer 390 may include the functionality of storage management type programs known in the art that manage the transfer of data to and from a data storage system, such as the IBM DFSMS implemented in the IBM MVS operating system.

In certain embodiments, Applicants' data storage system includes a plurality of host adapters. In the illustrated embodiment of FIG. 1, system 100 comprises host adapters 102-105, 107-110, 112-115 and 117-120. In other embodiments, Applicants' data storage system includes fewer than 16 host adapters. In still other embodiments, Applicants' data storage system includes more than 16 host adapters. In certain embodiments, one or more of the host adapters are multi-ported. Regardless of the number of host adapters disposed in any embodiments of Applicants' system, each of those host adapters comprises a shared resource that has equal access to both central processing/cache elements 130 and 140.

Each host adapter may comprise one or more Fibre Channel ports, one or more FICON ports, one or more ESCON ports, or one or more SCSI ports, and the like. Each host adapter is connected to both clusters through interconnect bus 121 such that each cluster can handle I/O from any host adapter. Internal buses in each subsystem are connected via a Remote I/O bridge 155/195 between the processor portions 130/140 and I/O portions 160/170, respectively.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters 161 which in the illustrated embodiment of FIG. 1 comprises device adapters 165, 166, 167, and 168. I/O portion 160 further comprise nonvolatile storage ("NVS") 162 and battery backup 164 for NVS 162.

I/O portion 170 comprises a plurality of device adapters 171 which in the illustrated embodiment of FIG. 1 comprises device adapters 175, 176, 177, and 178. I/O portion 170 further comprises nonvolatile storage ("NVS") 172 and battery backup 174 for NVS 172.

In certain embodiments of Applicants' system, one or more host adapters, processor portion 130, and one or more device adapters are disposed on a first control card disposed in Applicants' data storage system. Similarly, in certain embodiments, one or more host adapters, processor portion 140, one or more device adapters are disposed on a second control card disposed in Applicants' data storage system.

In the illustrated embodiment of FIG. 1, sixteen data storage devices are organized into two arrays, namely array 180 and array 190. The illustrated embodiment of FIG. 1 shows two storage device arrays.

In certain embodiments, one or more of the data storage devices comprise a plurality of hard disk drive units. In certain embodiments, arrays 180 and 190 utilize a RAID protocol. In certain embodiments, arrays 180 and 190 comprise what is sometimes called a JBOD array, i.e. "Just a Bunch Of Disks" where the array is not configured according to RAID. In certain embodiments, arrays 180 and 190 comprise what is sometimes called an SBOD array, i.e. "Switched Bunch Of Disks".

The illustrated embodiment of FIG. 1 shows two storage device arrays. In other embodiments, Applicants' system includes a single storage device array. In yet other embodiments, Applicants' system includes more than two storage device arrays.

Figure 2:
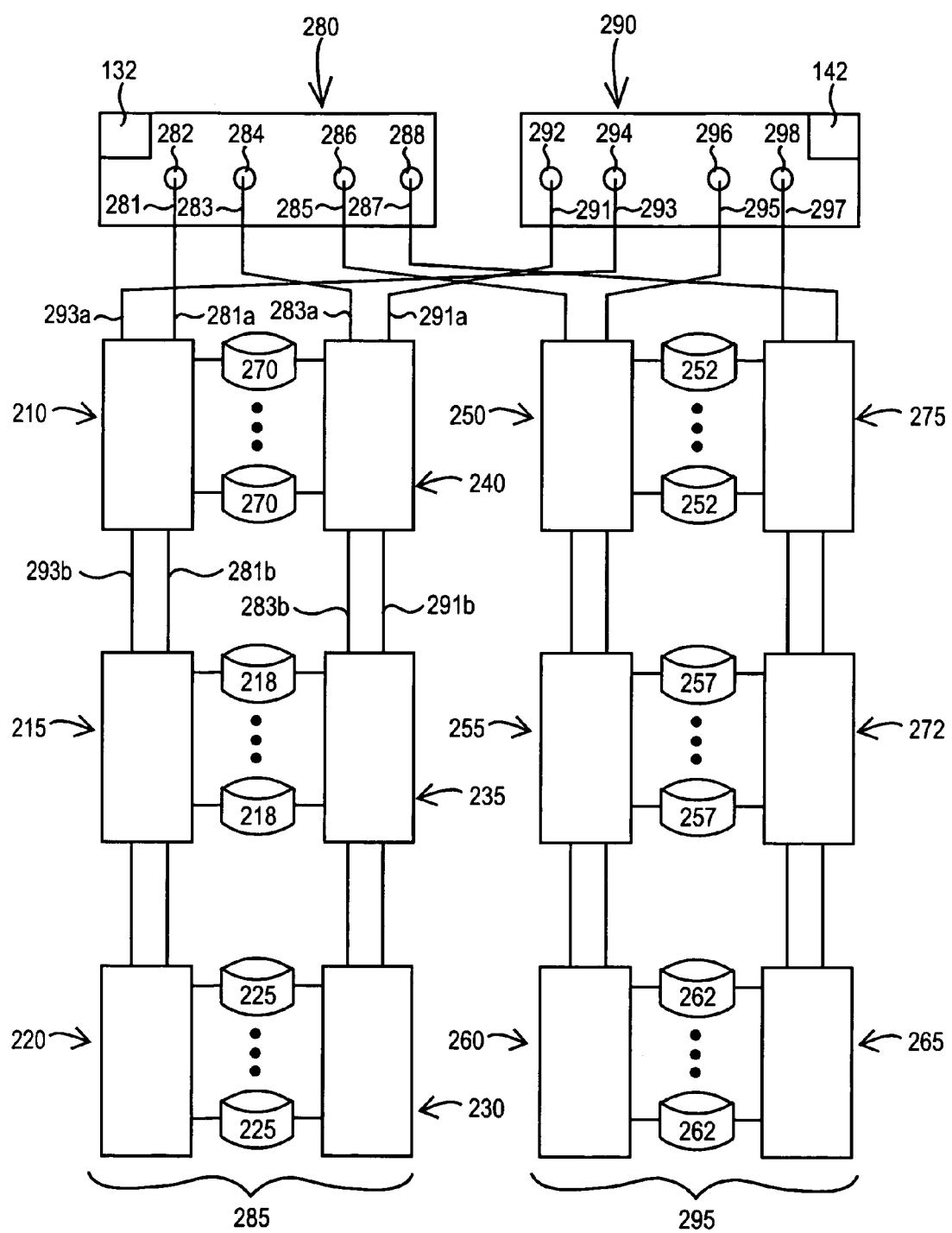
FIG. 2 is a block diagram showing the data storage system of FIG. 1 comprising two fiber channel arbitrated loops.

In the illustrated embodiment of FIG. 2, Applicants' data storage system comprises two dual fibre channel arbitrated ("FC-AL") loops of switches 285 and 295, wherein controllers 280 and 290 are each interconnected to each of the two FC-AL loops. Controller 280 comprises processor 132 (FIGS. 1, 2) and device adapters interface ports 282, 284, 286, and 288. Controller 290 comprises processor 142 (FIGS. 1, 2) and device adapters interface ports 292, 294, 296, and 298. The illustrated embodiment of FIG. 2 should not be construed to limit Applicants' invention to use of fibre channel networks or devices. The recitation of two FC-AL loops the illustrated embodiment of FIG. 2 comprises one embodiment of Applicants' apparatus. In other embodiments, other network topologies and devices are utilized, including without limitation SAS devices and/or SATA devices.

Each FC-AL loop contains a plurality of local controllers. For example, FC-AL loop 285 comprises local controllers 210, 215, 220, 230, 235, and 240. FC-AL loop 295 comprises local controllers 250, 255, 260, 265, 272, and 275.

Each local controller comprises a switch and a processor. In certain embodiments, the switch comprises a Fibre Channel switch. In certain embodiments, the processor comprises a SES processor. In certain embodiments, Applicants' apparatus further includes a midplane interconnecting one or more switches to one or more data storage devices. In the illustrated embodiment of FIG. 3, local controller 210 (FIGS. 2, 3, 4) comprises Fibre Channel switch 214 (FIGS. 3, 4A, 4B, 4C) and SES processor 212 (FIGS. 3, 4A, 4B, 4C). A plurality of communication links 320 interconnect Fibre Channel switch 214 to midplane 310. A plurality of communication links 340 (FIGS. 3, 4A, 4B, 4C) interconnect data storage devices 270 (FIGS. 2, 3) with midplane 310 (FIGS. 3, 4A, 4B, 4C).

Local controller 240 (FIGS. 2, 3, 4A, 4B, 4C) comprises Fibre Channel switch 244 (FIGS. 3, 4A, 4B, 4C) and SES processor 242 (FIGS. 3, 4A, 4B, 4C). A plurality of communication links 330 (FIGS. 3, 4A, 4B, 4C) interconnect Fibre Channel switch 244 to midplane 310.

Signals are provided by switch 214 to data storage devices 270 via communication links 320, communication links 340, and midplane 310. Similarly, signals are provided by switch 244 to data storage devices 270 via communication links 330, communication links 340, and midplane 310.

In certain embodiments, the pluralities of data storage devices 218, 225, 252, 257, 262, and 270, are configured into a plurality of storage arrays. In certain embodiments, one or more of that plurality of storage arrays are configured to utilize one or more RAID protocols, i.e. one or more RAID arrays.

Referring once again to FIG. 2, in certain embodiments, such a RAID array comprises a plurality of data storage devices interconnected with the same local controller, such as for example local controller 210. In certain embodiments, such a RAID array comprises a plurality of data storage devices interconnected with two or more local controllers, such as for example local controllers 210 and 215, interconnected with the same FC-AL loop, such as FC-AL loop 285. In certain embodiments, such a RAID array comprises a plurality of data storage devices interconnected with two or more local controllers, such as for example local controllers 210 and 275, wherein those local controllers are interconnected with different FC-AL loops, such as FC-AL loops 285 and 295.

Figure 3:
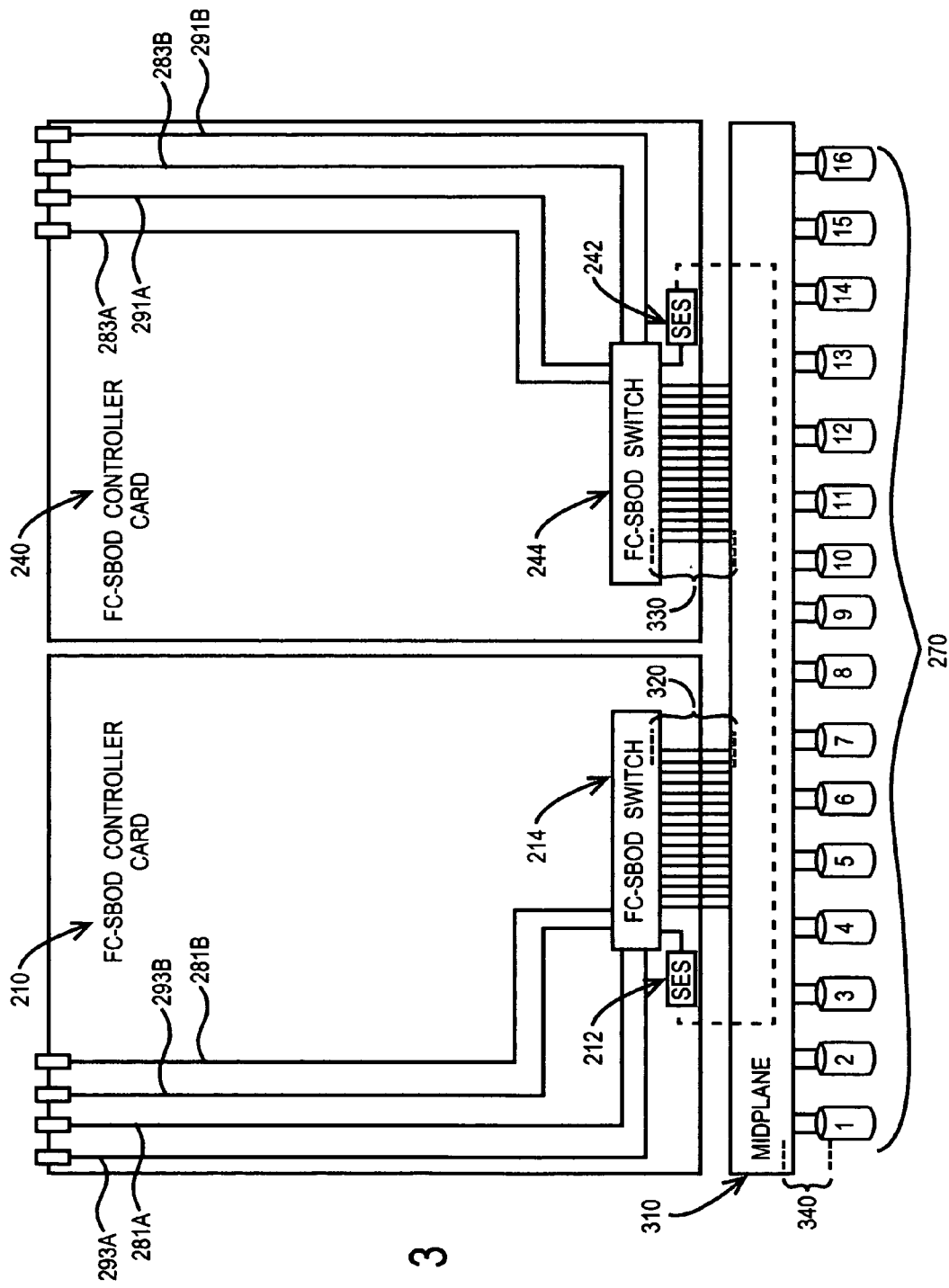
FIG. 3 is a block diagram showing a plurality of data storage devices interconnected to a fibre channel arbitrated loop switch.
Figure 4A:
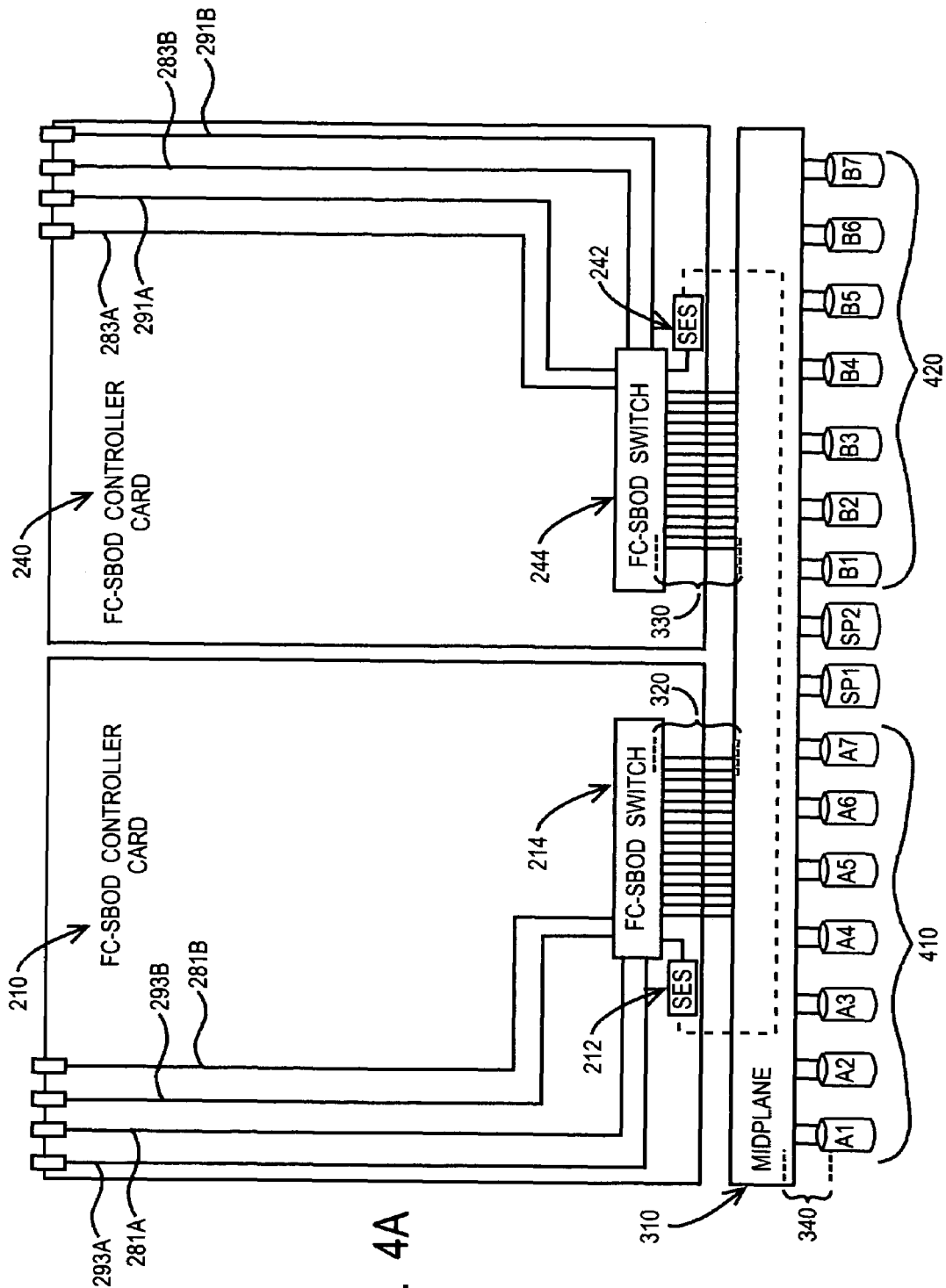
FIG. 4A is a block diagram showing the plurality of data storage devices of FIG. 3 configured in two storage arrays.

For example and referring to FIGS. 3 and 4A, data storage devices 1, 2, 3, 4, 5, 6, and 7, recited in FIG. 3 are configured into RAID array 410, wherein RAID array 410 comprises devices A1, A2, A3, A4, A5, A6, A7. In the illustrated embodiments of FIGS. 3 and 4A, data storage devices 10, 11, 12, 13, 14, 15, and 16, recited in FIG. 3 are configured into RAID array 420, wherein RAID array 420 comprises devices B1, B2, B3, B4, B5, B6, and B7. Data storage devices 8 and 9 are designated spare data storage devices SP1 and SP2.

Figure 4B:
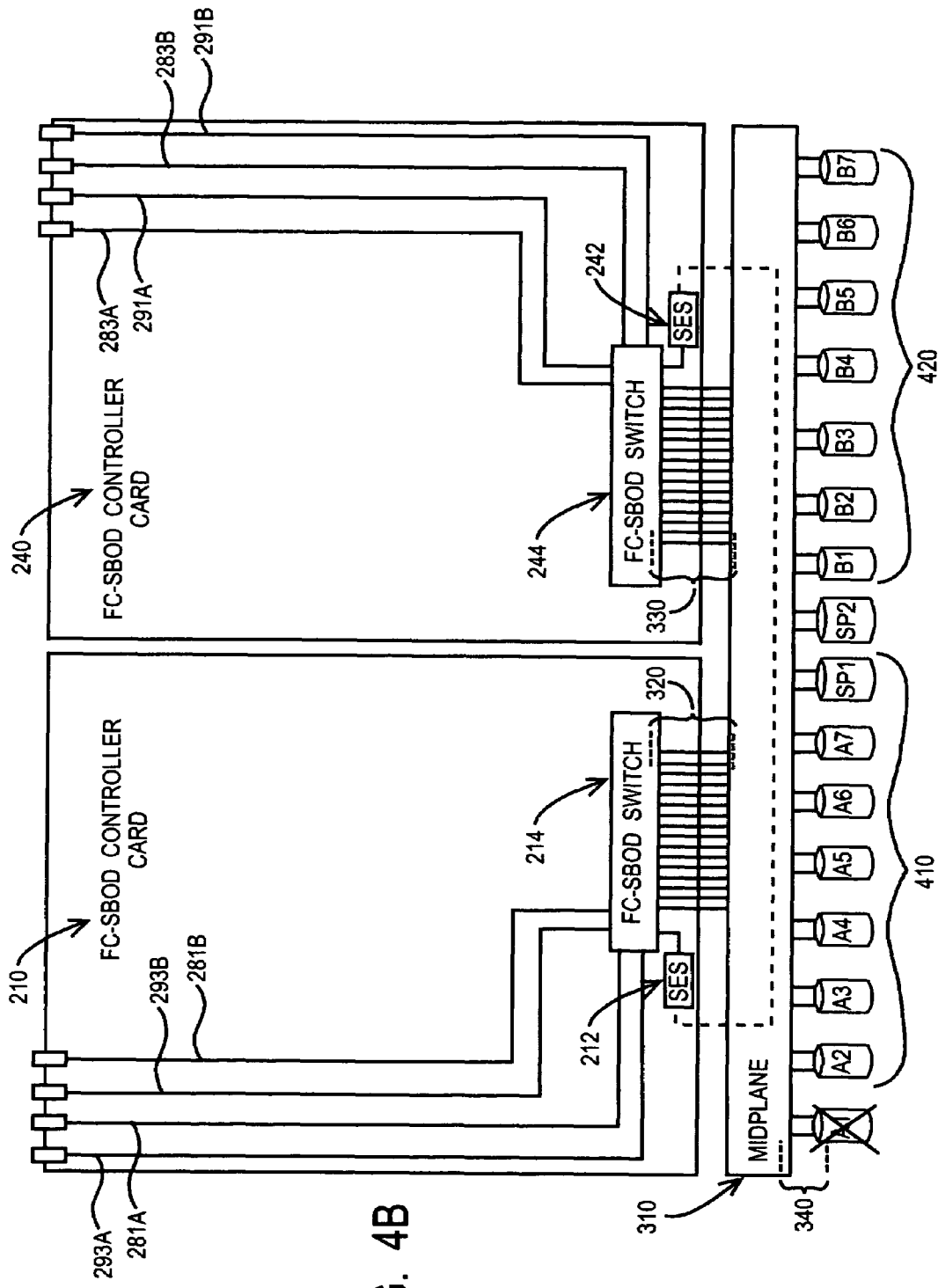
FIG. 4B is a block diagram showing a first reconfiguration of one of the storage arrays of FIG. 4A.
Figure 4C:
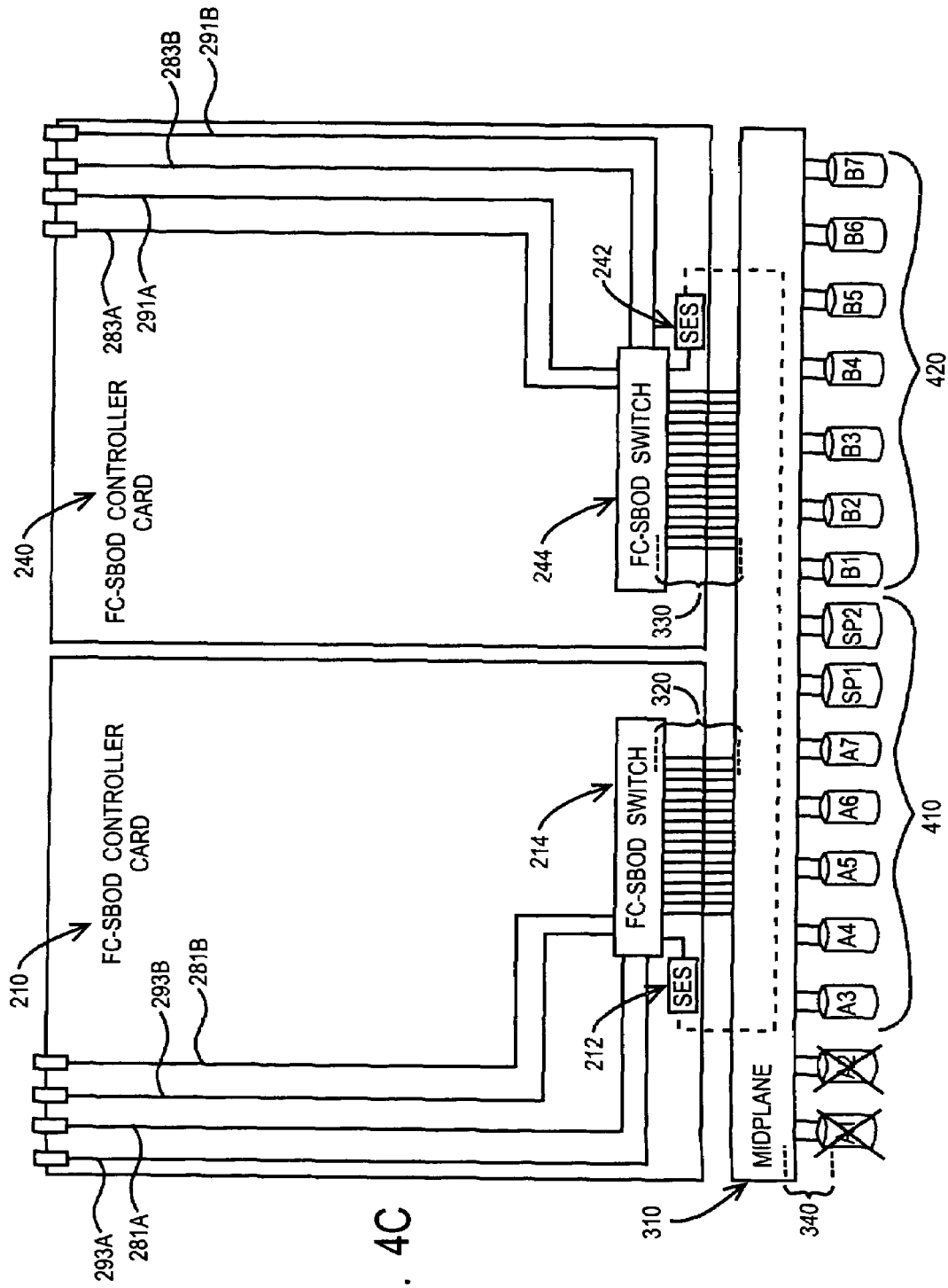
FIG. 4C is a block diagram showing a second reconfiguration of one of the storage arrays of FIG. 4A.

Referring now to FIG. 4B, in the event a device configured in RAID array 410, such as for example device A1, fails, then Applicants' apparatus and method reconfigure RAID array 410 to comprise devices A2, A3, A4, A5, A6, A7, and SP1. Referring now to FIG. 4C, in the event another device configured in RAID array 410, such as for example device A2, fails, then Applicants' apparatus and method reconfigure RAID array 410 to comprise devices A3, A4, A5, A6, A7, SP1, and SP2.

After repair of the failed device A1, wherein that repair may require removal of data storage device A1 from data storage system 100, repair, and reinstallation of data storage device A1 in system 100, Applicants' invention comprises a method to determine whether to designate the repaired and unassigned device A1 as a spare device, or whether to reconfigure a storage array to comprise that unassigned device A1.

More generally, upon the failure of a data storage device configured in a first one of a plurality of storage arrays, Applicants' apparatus and method reconfigure that first array to comprise a spare data storage device disposed in any of the plurality of storage arrays. Upon repair of the failed data storage device, Applicants' invention implements Applicants' method to determine whether to designated that repaired and unassigned data storage device as a spare device, or whether to reconfigure one or more storage arrays to comprise that unassigned device.

In storage systems that implement a storage array comprising a plurality of data storage devices, the reliability, performance, and efficiency, of the array is dependent upon the configuration of that array. For example, the reliability of RAID arrays is dependent upon the locations of the data storage devices comprising that array, and is further dependent on the failure modes of the communication network interconnecting that plurality of data storage device.

For mirrored RAID types, including without limitation RAID 1, RAID 10 [RAID 1+0 and RAID 0+1] storage arrays, the reliability of that storage array is optimized when a network failure only impacts a single mirror of the mirrored pair. Therefore, the reliability of a mirrored RAID array type is optimal if, for each mirrored data storage device pair, one of the mirrored devices is interconnected with a first communication network and the other of the mirrored devices is interconnected with a second communication network. On the other hand, the reliability of a mirrored RAID array type is degraded if, for any mirrored data storage device pair, both of the mirrored devices are interconnected with the same communication network.

The reliability of a degraded mirrored RAID type array can be restored to optimal by reconfiguring that array comprising one mirrored data storage device pair interconnected with the same communication network to deconfigure one of those data storage devices from the array and replace that deconfigured device with a data storage device interconnected with a different communication network. The reliability of a degraded mirrored RAID type array can be increased by reconfiguring that array comprising (N) mirrored data storage device pairs interconnected with the same communication network to delete from the array a data storage device disposed in one of those (N) mirrored pairs and replace that deleted device with a data storage device interconnected with a different communication network, wherein (N) is greater than or equal to 2.

For non-mirrored RAID types, including without limitation RAID 0, RAID 3, RAID 4, RAID 5, and RAID 6, the reliability of that array is optimized when the number of network failure modes are minimized. Therefore, the reliability of a non-mirrored RAID array type is optimal if each of the plurality of data storage devices comprising that array is interconnected to the same communication network. On the other hand, the reliability of a non-mirrored RAID array type is degraded if any of the plurality of data storage devices comprising that array are interconnected to different communication networks.

The reliability of a degraded non-mirrored RAID type array can be restored to optimal by reconfiguring that array comprising (M) data storage devices interconnected with a first communication network and one data storage device interconnected with a second communication network, to delete from the array the one device interconnected to the second communication network and replace that deleted device with a data storage device interconnected with the first communication network. The reliability of a degraded non-mirrored RAID type array can be increased by reconfiguring that array comprising (M) data storage devices interconnected with a first communication network and (P) data storage devices interconnected with a second communication network, to delete from the array one of the (P) data storage devices and replace that deleted device with a data storage device interconnected with the first communication network, wherein (M) is greater than (P), and wherein (P) is greater than or equal to 2.

For purposes of this Application, the performance of a RAID array is optimal if each data storage device configured in that array comprises the same operational speed. The performance of a RAID array is degraded if some of the data storage devices configured in that array comprise a first operational speed and the remaining data storage devices comprise a second operational speed. By "operational speed," Applicants mean an attribute selected from the group consisting of the storage device rotational speed, the device interface speed, and the like, where that attribute directly correlates to the data transfer rate of the data storage device. The performance of a RAID array comprising (Q) data storage devices, wherein (Q-1) of those data storage devices comprise a first operational speed and wherein the remaining data storage device comprises a second operational speed, can be restored to optimal by reconfiguring the array to replace the second operational speed device with a first operational speed device, wherein the second operational speed can be either less than, or greater than, the first operational speed.

The performance of a RAID array comprising (Q) data storage devices, wherein (Q-1) of those data storage devices comprise a first operational speed and the remaining data storage device comprises a second operational speed, wherein the difference between the first operational speed and the second operational speed comprises a first operational speed difference, can be increased by reconfiguring the array to replace the second operational speed device with a third operational speed device, wherein the difference between the first operational speed and the third operational speed comprises a second operational speed difference such that the absolute magnitude of the second operational speed difference is less than the absolute magnitude of the first operational speed difference. In addition, the performance of a RAID array comprising (Q) data storage device, wherein (Q-2) of those data storage devices comprise a first operational speed and the remaining two device comprise a second operational speed can be increased by reconfiguring that array to replace one of the second operational speed devices with a first operational speed device, wherein the second operational speed can be either less than, or greater than, the first operational speed.

For purposes of this Application, the efficiency of a RAID array is optimal if each of the data storage devices configured in that array comprises the same effective storage capacity. By "effective storage capacity," Applicants mean the storage capacity of the data storage device comprising the smallest storage capacity disposed in that RAID array. The efficiency of a RAID array comprising (R) data storage devices, wherein (R-1) of those data storage devices comprise a first storage capacity and the remaining data storage device comprises a second storage capacity can be restored to optimal efficiency by reconfiguring the array to replace the second storage capacity device with a first storage capacity device, wherein the second storage capacity can be either less than or greater than the first storage capacity.

The efficiency of a RAID array comprising (R) data storage devices, wherein (R-1) of those data storage devices comprise a first storage capacity and the remaining data storage device comprises a second storage capacity, wherein the difference between the first storage capacity and the second storage capacity comprises a first capacity difference, can be increased by reconfiguring the array to replace the second storage capacity device with a third storage capacity device, wherein the difference between the first storage capacity and the third storage capacity comprises a second capacity difference such that the absolute magnitude of the second capacity difference is less than the absolute magnitude of the first capacity difference. In addition, the efficiency of a RAID array comprising (R) data storage devices, wherein (R-2) of those data storage devices comprise a first storage capacity and the remaining two data storage device comprise a second storage capacity can be increased by reconfiguring the array to replace one of the second storage capacity devices with a first storage capacity device.

Figure 8:
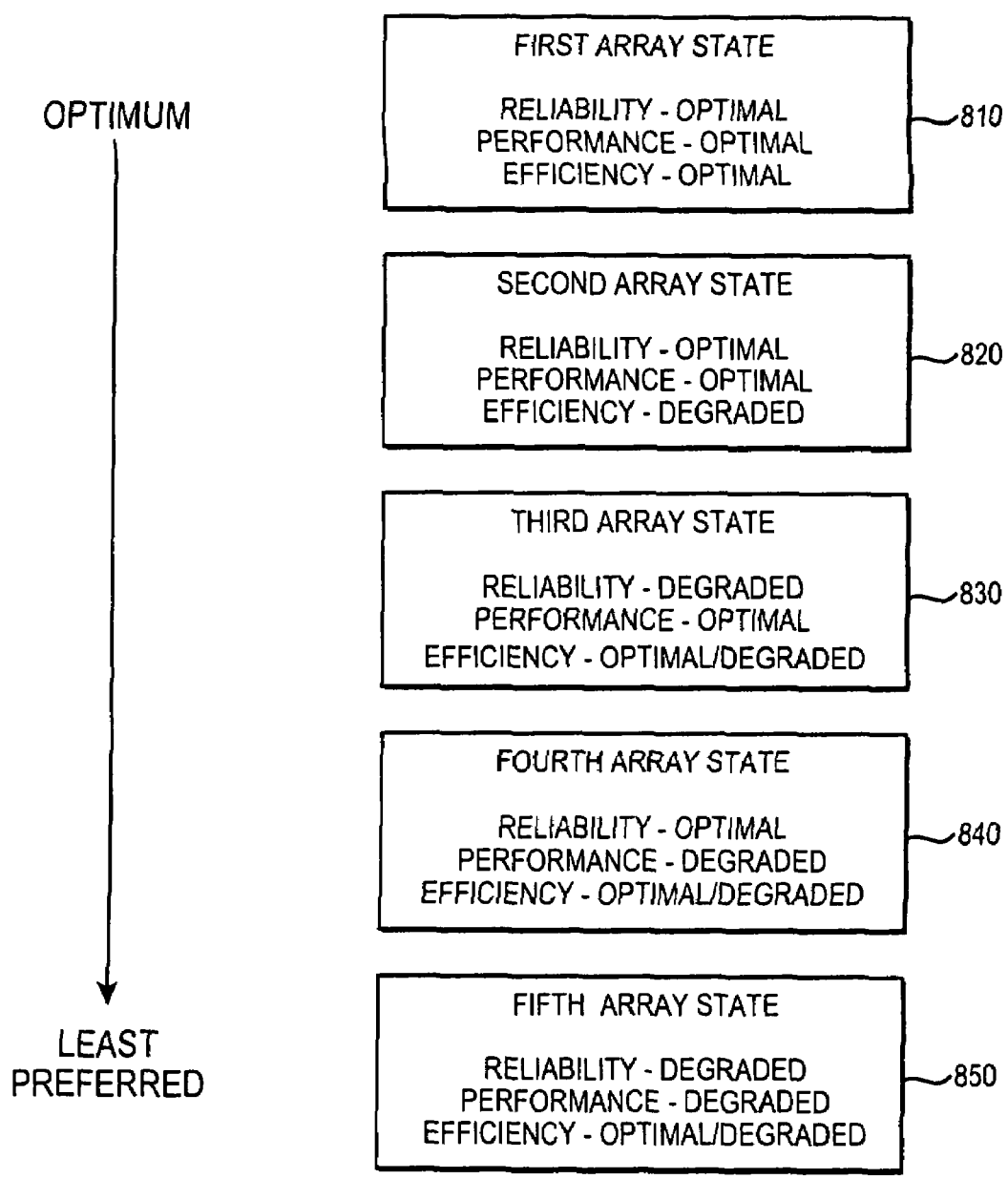
FIG. 8 is a block diagram showing Applicants' hierarchical ranking of storage array states.

Applicants' invention comprises a hierarchical preference order for storage array states, and implements that preference order in Applicants' method. FIG. 8 recites Applicants' hierarchical ranking of storage array states.

Referring now to FIG. 8, First Array State 810 comprise the optimal array state, wherein that array comprises optimal reliability, as defined herein, optimal performance, as defined herein, and optimal efficiency, as defined herein. Array states 820, 830, 840, and 850, comprise increasingly degraded array states. A storage array comprising the Second Array State 820 comprises optimal reliability and performance, but degraded efficiency, as defined herein. A storage array comprising the Third Array State 830 comprises optimal performance, but degraded efficiency and degraded reliability, as defined herein. A storage array comprising the Fourth Array State 840 comprises optimal reliability and efficiency, but degraded performance, as defined herein. A storage array comprising the Fifth Array State 850 comprises optimal efficiency, but degraded reliability and degraded efficiency and degraded reliability.

As those skilled in the art will appreciate, RAID technology provides methods to automatically reconfigure an array of storage devices when a storage device configured in that RAID array fails. For example, it is known in the art to reconfigure a storage array comprising a failed device to include a spare data storage device in place of the failed device to restore the redundancy attributes of the storage array. A consequence of such a reconfiguration, the reconfigured storage array may comprise less than optimal reliability, and/or less than optimal performance, and/or less than optimal efficiency. Thereafter, the failed device may be repaired and/or replaced, and that unassigned repaired/replacement device is then made available.

Figure 5:
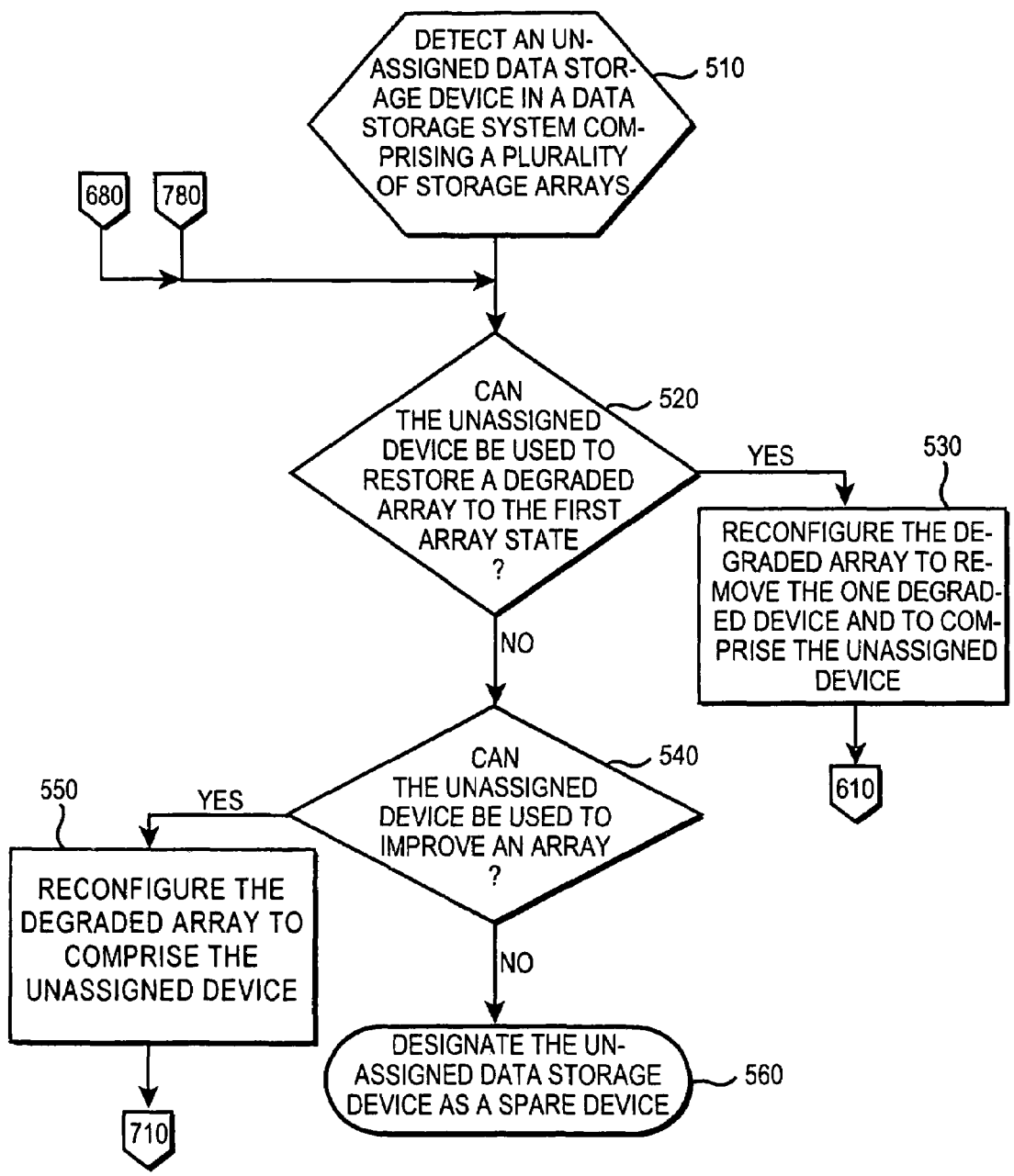
FIG. 5 is a flow chart summarizing certain steps of Applicants' method.

Applicants' invention comprises a method to detect such an unassigned device, and algorithmically determine a desirable utilization for that unassigned device. FIG. 5 summarizes certain steps of Applicants' method.

Referring now to FIG. 5, in step 510 Applicants' method installs, creates, and/or detects an unassigned data storage device in a data storage system, such as for example system 100, wherein that data storage system comprises a plurality of storage arrays. For purposes of this Application, that unassigned data storage device comprises optimal reliability, optimal performance, and optimal efficiency. For purposes of this Application, by "unassigned data storage device," Applicants' mean a data storage device not configured in any of the plurality of storage arrays as either an active data storage device or designated as a spare data storage device.

In step 520, Applicants' method determines if the unassigned device can restore to optimal reliability, optimal performance, and optimal efficiency a degraded storage array. By "degraded storage array," Applicants mean a storage array comprising one or more degraded data storage devices. By "degraded data storage device," Applicants mean a data storage device comprising degraded reliability, as defined herein, and/or degraded performance, as defined herein, and/or degraded efficiency, as defined herein. In order to restore a degraded storage array to optimal reliability, optimal performance, and optimal efficiency, using the unassigned data storage device the degraded array comprises one degraded data storage device.

In certain embodiments, step 520 is performed by a processor, such as processor 132 (FIGS. 1, 2) and/or processor 142 (FIGS. 1, 2) disposed in Applicants' data storage system 100 (FIG. 1).

If Applicants' method determines in step 520 that the unassigned data storage device can be used to restore a degraded storage array to optimal reliability, optimal performance, and optimal efficiency, then the method transitions from step 520 to step 530 wherein the method reconfigures the degraded storage array to remove the degraded data storage device and to include the unassigned data storage device. In certain embodiments, step 520 is performed by a processor, such as processor 132 (FIGS. 1, 2) and/or processor 142 (FIGS. 1, 2) disposed in Applicants' data storage system 100 (FIG. 1). In certain embodiments, steps 520 and 530 further comprise the steps recited in FIG. 6.

If Applicants' method determines in step 520 that the unassigned data storage device cannot be used to restore a storage array to optimal reliability, optimal performance, and optimal efficiency, then the method transitions from step 520 to step 540 wherein the method determines if the unassigned data storage device can be used to improve a degraded data storage array. In certain embodiments, step 540 is performed by a processor, such as processor 132 (FIGS. 1, 2) and/or processor 142 (FIGS. 1, 2) disposed in Applicants' data storage system 100 (FIG. 1).

If Applicants' method determines in step 540 that the unassigned data storage device can improve a degraded storage array, then the method transitions from step 540 to step 550 wherein the method reconfigures the degraded storage array to remove a degraded data storage device and to comprise the unassigned data storage device. In certain embodiments, step 550 is performed by a processor, such as processor 132 (FIGS. 1, 2) and/or processor 142 (FIGS. 1, 2) disposed in Applicants' data storage system 100 (FIG. 1). In certain embodiments, steps 540 and 550 further comprise the steps recited in FIG. 7.

If Applicants' method determines in step 540 that the unassigned data storage device cannot improve a degraded storage array, then the method transitions from step 540 to step 560 wherein the method designates the unassigned data storage device as a spare device. In certain embodiments, step 560 is performed by a processor, such as processor 132 (FIGS. 1, 2) and/or processor 142 (FIGS. 1, 2) disposed in Applicants' data storage system 100 (FIG. 1).

In certain embodiments, the method of FIG. 5 is implemented by a data storage services provider to provide data storage services to one or more data storage services customers, wherein the data storage services provider receives client data from the one or more data storage services customers, and writes that data to one or more storage arrays disposed in a data storage system comprising two or more data storage arrays, wherein that data storage system is owned and/or operated by the data storage services provider.

Figure 6:
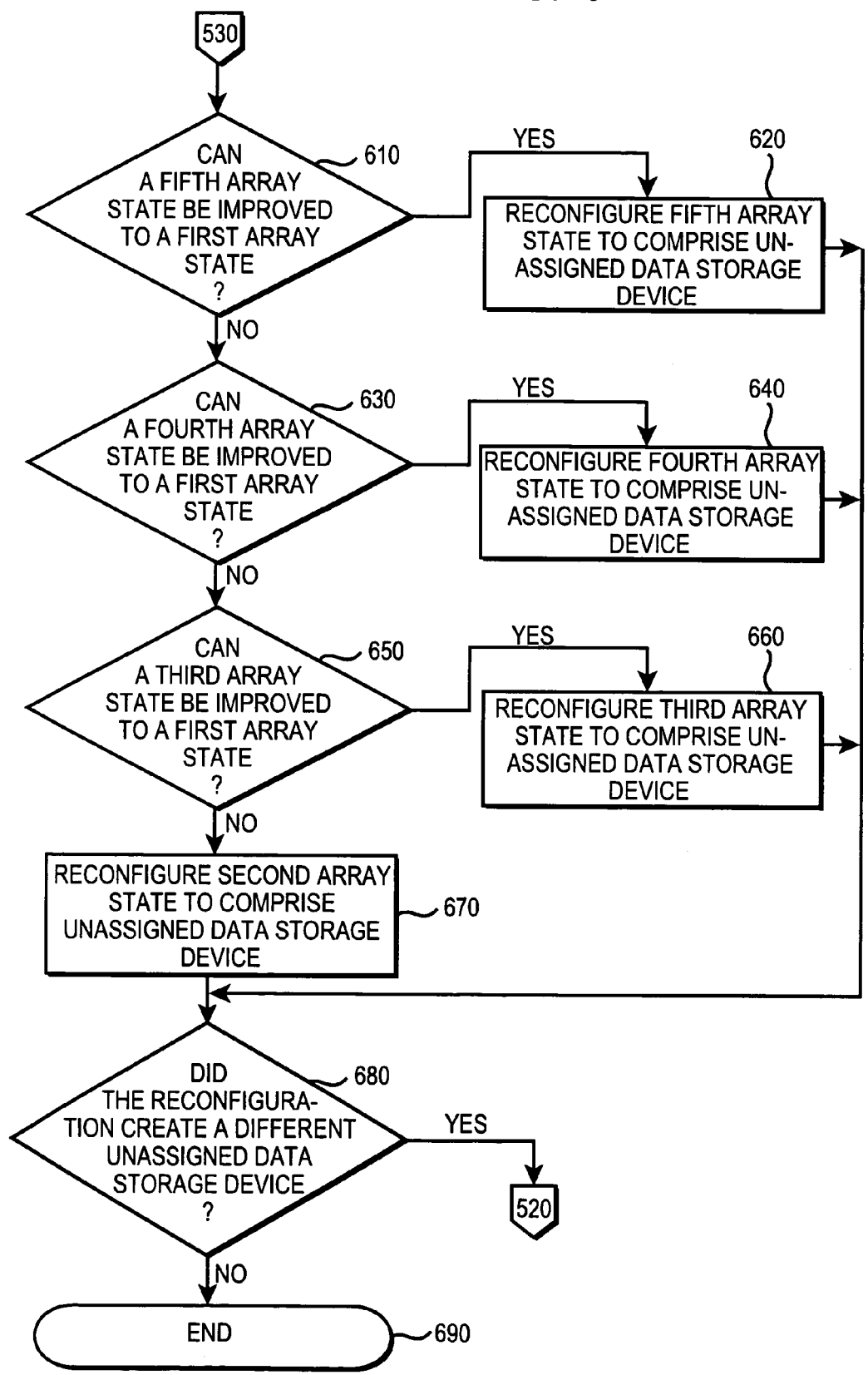
FIG. 6 is a flow chart summarizing certain additional steps of Applicants' method.

In certain embodiments of Applicants' method, steps 520 and 530 further comprise the steps recited in FIG. 6. Referring now to FIG. 6, in step 610 Applicants' method determines if a degraded array comprising the Fifth Array State 850 (FIG. 8) can be reconfigured using the unassigned data storage device to comprise the First Array State 810 (FIG. 8). In certain embodiments, step 610 is performed by a processor, such as processor 132 (FIGS. 1, 2) and/or processor 142 (FIGS. 1, 2) disposed in Applicants' data storage system 100 (FIG. 1).

If Applicants' method determines in step 610 that a degraded array comprising the Fifth Array State 850 (FIG. 8) can be reconfigured using the unassigned data storage device to comprise the First Array State 810 (FIG. 8), then Applicants' method transitions from step 610 to step 620 wherein the method reconfigures the degraded storage array comprising the Fifth Array State to remove therefrom a degraded data storage device and to comprise the unassigned data storage device. In certain embodiments, step 620 is performed by a processor, such as processor 132 (FIGS. 1, 2) and/or processor 142 (FIGS. 1, 2) disposed in Applicants' data storage system 100 (FIG. 1). Applicants' method transitions from step 620 to step 680.

If Applicants' method determines in step 610 that a degraded array comprising the Fifth Array State 850 (FIG. 8) cannot be reconfigured using the unassigned data storage device to comprise the First Array State 810 (FIG. 8), then Applicants' method transitions from step 610 to step 630 wherein the method determines if a degraded array comprising the Fourth Array State 850 (FIG. 8) can be reconfigured using the unassigned data storage device to comprise the First Array State 810 (FIG. 8). In certain embodiments, step 610 is performed by a processor, such as processor 132 (FIGS. 1, 2) and/or processor 142 (FIGS. 1, 2) disposed in Applicants' data storage system 100 (FIG. 1).

If Applicants' method determines in step 630 that a degraded array comprising the Fourth Array State 840 (FIG. 8) can be reconfigured using the unassigned data storage device to comprise the First Array State 810 (FIG. 8), then Applicants' method transitions from step 630 to step 640 wherein the method reconfigures the array comprising the Fourth Array State 840 to comprise the unassigned data storage device. In certain embodiments, step 640 is performed by a processor, such as processor 132 (FIGS. 1, 2) and/or processor 142 (FIGS. 1, 2) disposed in Applicants' data storage system 100 (FIG. 1). Applicants' method transitions from step 640 to step 680.

If Applicants' method determines in step 630 that a degraded array comprising the Fourth Array State 850 (FIG. 8) cannot be reconfigured using the unassigned data storage device to comprise the First Array State 810 (FIG. 8), then Applicants' method transitions from step 630 to step 650 wherein the method determines if a degraded array comprising the Third Array State 830 (FIG. 8) can be reconfigured using the unassigned data storage device to comprise the First Array State 810 (FIG. 8). In certain embodiments, step 650 is performed by a processor, such as processor 132 (FIGS. 1, 2) and/or processor 142 (FIGS. 1, 2) disposed in Applicants' data storage system 100 (FIG. 1).

If Applicants' method determines in step 650 that a degraded array comprising the Third Array State 830 (FIG. 8) can be reconfigured using the unassigned data storage device to comprise the First Array State 810 (FIG. 8), then Applicants' method transitions from step 650 to step 660 wherein the method reconfigures storage array comprising the Third Array State 830 (FIG. 8) to remove therefrom a degraded data storage device and to comprise the unassigned data storage device. In certain embodiments, step 660 is performed by a processor, such as processor 132 (FIGS. 1, 2) and/or processor 142 (FIGS. 1, 2) disposed in Applicants' data storage system 100 (FIG. 1). Applicants' method transitions from step 660 to step 680.

If Applicants' method determines in step 650 that a degraded array comprising the Third Array State 850 (FIG. 8) cannot be reconfigured using the unassigned data storage device to comprise the First Array State 810 (FIG. 8), then Applicants' method transitions from step 650 to step 670 wherein the method reconfigures a degraded array comprising the Second Array State 820 (FIG. 8) to remove therefrom a degraded data storage device and to comprise the unassigned data storage device. In certain embodiments, step 670 is performed by a processor, such as processor 132 (FIGS. 1, 2) and/or processor 142 (FIGS. 1, 2) disposed in Applicants' data storage system 100 (FIG. 1).

Applicants' method transitions from step 670 to step 680 wherein the method determines if a storage array reconfiguration has created a different unassigned data storage device, i.e. a data storage device not configured in a storage array and not designated a spare data storage device. For example, if a storage array is reconfigured in any of steps 620, 640, 660, or 670, to comprise the unassigned data storage device and to remove from the array a degraded data storage device, that degraded data storage device comprises a different unassigned device.

If Applicants' method detects in step 680 a different unassigned data storage device, then the method transitions from step 680 to step 520 and continues as described herein. Alternatively, if Applicants' method does not detect in step 680 a different unassigned data storage device, then the method transitions from step 680 to step 690 and ends.

Figure 7:
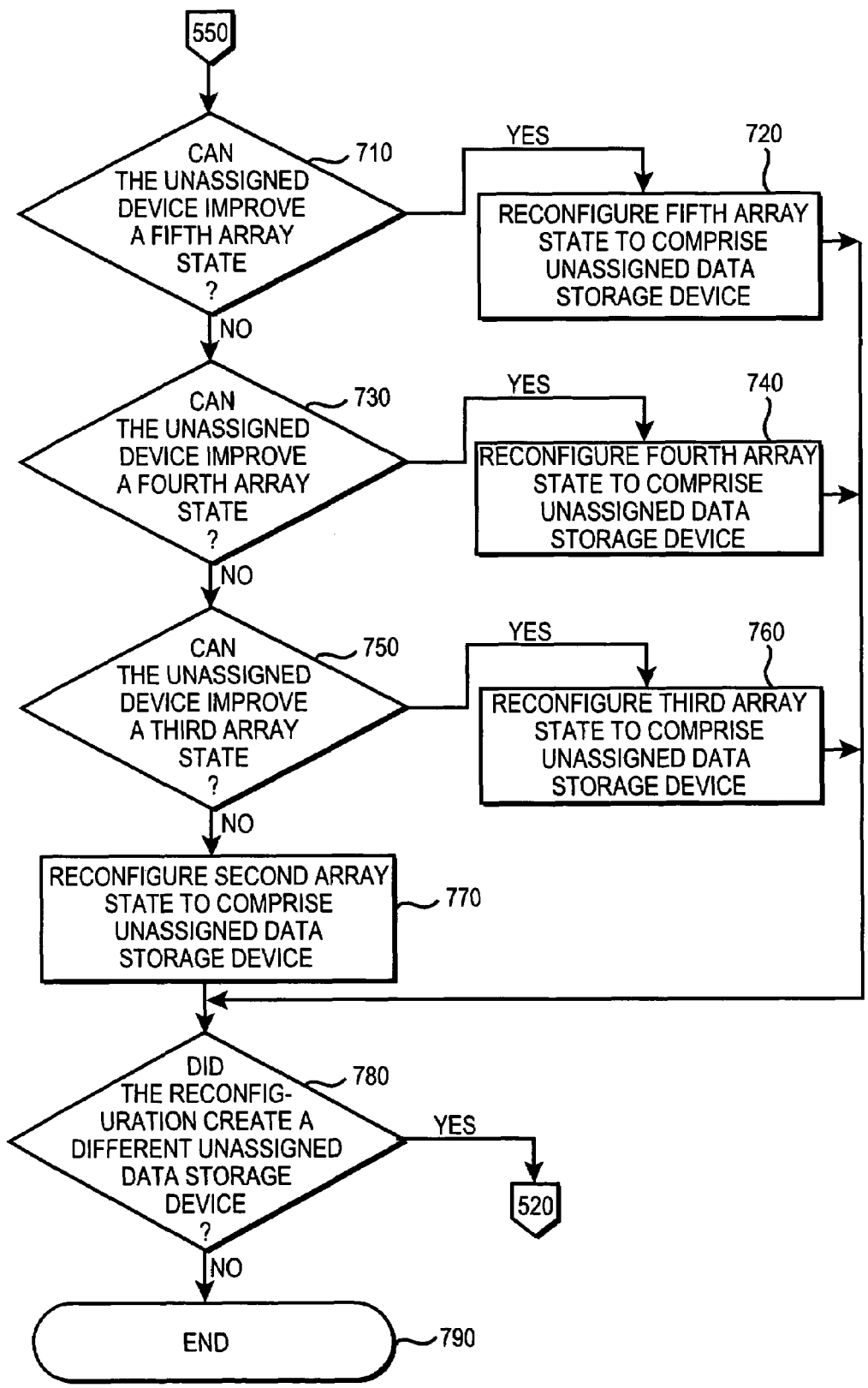
FIG. 7 is a flow chart summarizing certain additional steps of Applicants' method.

Referring once again to FIG. 5, in certain embodiments steps 540 and 550 further comprise the steps recited in FIG. 7. Referring now to FIG. 7, in step 710 Applicants' method determines if a degraded array comprising the Fifth Array State 850 (FIG. 8) can be improved using the unassigned data storage device. If Applicants' method determines in step 710 that a degraded array comprising the Fifth Array State 850 (FIG. 8) can be improved using the unassigned data storage device, then Applicants' method transitions from step 710 to step 720 wherein the method reconfigures the degraded storage array comprising the Fifth Array State to remove a degraded data storage device and to comprise the unassigned data storage device. In certain embodiments, step 620 is performed by a processor, such as processor 132 (FIGS. 1, 2) and/or processor 142 (FIGS. 1, 2) disposed in Applicants' data storage system 100 (FIG. 1). Applicants' method transitions from step 720 to step 780.

If Applicants' method determines in step 710 that a degraded array comprising the Fifth Array State 850 (FIG. 8) cannot be improved using the unassigned data storage device, then Applicants' method transitions from step 710 to step 730 wherein the method determines if a degraded array comprising the Fourth Array State 840 (FIG. 8) can be improved using the unassigned data storage device. In certain embodiments, step 730 is performed by a processor, such as processor 132 (FIGS. 1, 2) and/or processor 142 (FIGS. 1, 2) disposed in Applicants' data storage system 100 (FIG. 1).

If Applicants' method determines in step 730 that a degraded array comprising the Fourth Array State 840 (FIG. 8) can be improved using the unassigned data storage device, then Applicants' method transitions from step 730 to step 740 wherein the method reconfigures the degraded storage array comprising the Fourth Array State to remove a degraded data storage device and to comprise the unassigned data storage device. In certain embodiments, step 740 is performed by a processor, such as processor 132 (FIGS. 1, 2) and/or processor 142 (FIGS. 1, 2) disposed in Applicants' data storage system 100 (FIG. 1). Applicants' method transitions from step 740 to step 780.

If Applicants' method determines in step 730 that a degraded array comprising the Fourth Array State 850 (FIG.

8) cannot be improved using the unassigned data storage device, then Applicants' method transitions from step 730 to step 750 wherein the method determines if a degraded array comprising the Third Array State 830 (FIG. 8) can be improved using the unassigned data storage device. In certain embodiments, step 830 is performed by a processor, such as processor 132 (FIGS. 1, 2) and/or processor 142 (FIGS. 1, 2) disposed in Applicants' data storage system 100 (FIG. 1).

If Applicants' method determines in step 750 that a degraded array comprising the Third Array State 830 (FIG. 8) can be improved using the unassigned data storage device, then Applicants' method transitions from step 750 to step 760 wherein the method reconfigures the degraded storage array comprising the Third Array State to remove a degraded data storage device and to comprise the unassigned data storage device. In certain embodiments, step 760 is performed by a processor, such as processor 132 (FIGS. 1, 2) and/or processor 142 (FIGS. 1, 2) disposed in Applicants' data storage system 100 (FIG. 1). Applicants' method transitions from step 760 to step 780.

If Applicants' method determines in step 750 that a degraded array comprising the Third Array State 850 (FIG. 8) cannot be improved using the unassigned data storage device, then Applicants' method transitions from step 750 to step 770 wherein the method reconfigures a degraded storage array comprising the Second Array State 820 (FIG. 8) to remove a degraded data storage device and to comprise the unassigned data storage device. In certain embodiments, step 770 is performed by a processor, such as processor 132 (FIGS. 1, 2) and/or processor 142 (FIGS. 1, 2) disposed in Applicants' data storage system 100 (FIG. 1).

Applicants' method transitions from step 770 to step 780 wherein the method determines if a storage array reconfiguration has created a different unassigned data storage device, i.e. a data storage device not configured in a storage array and not designated a spare data storage device. For example, if a storage array is reconfigured in any of steps 720, 740, 760, or 770, to comprise the unassigned data storage device and to remove from the array a degraded data storage device, that degraded data storage device comprises a different unassigned device.

If Applicants' method detects in step 780 a different unassigned data storage device, then the method transitions from step 780 to step 520 and continues as described herein. Alternatively, if Applicants' method does not detect in step 780 a different unassigned data storage device, then the method transitions from step 780 to step 790 and ends.

In certain embodiments, individual steps recited in FIGS. 5, 6, and/or 7, may be combined, eliminated, or reordered.

In certain embodiments, Applicants' data storage system comprises a computer useable medium having computer readable program code disposed therein to reconfigure one or more storage arrays disposed therein. In certain of these embodiments, Applicants' invention includes instructions residing memory 133 (FIG. 1) and/or memory 143 (FIG. 1), where those instructions are executed by a processor, such as processor 132 (FIGS. 1, 2) and/or 142 (FIGS. 1, 2), respectively, to perform one or more of steps 510, 520, 530, 540, 550, and/or 560, recited in FIG. 5, and/or one or more of steps 610, 620, 630, 640, 650, 660, 670, and/or 680, recited in FIG. 6, and/or one or more of steps 710, 720, 730, 740, 750, 760, 770, and/or 780, recited in FIG. 7.

In other embodiments, Applicants' invention includes instructions residing in any other computer program product, where those instructions are executed by a computer external to, or internal to, system 100, to perform steps one or more of steps 510, 520, 530, 540, 550, and/or 560, recited in FIG. 5, and/or one or more of steps 610, 620, 630, 640, 650, 660, 670, and/or 680, recited in FIG. 6, and/or one or more of steps 710, 720, 730, 740, 750, 760, 770, and/or 780, recited in FIG. 7. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to reconfigure a storage array disposed in a data storage system, comprising the steps of:
   supplying a data storage system comprising a plurality of data storage devices, wherein each of said plurality of data storage devices is assigned to one of a plurality of data storage arrays, or is assigned as a spare data storage device;
   detecting an unassigned data storage device;
   determining if any of said plurality of data storage arrays comprises a degraded data storage array;
   operative if any of said plurality of data storage arrays comprises a degraded data storage array, determining if said unassigned data storage device can be used to restore a degraded storage array comprising degraded reliability, degraded performance, and degraded efficiency, to optimal reliability, optimal performance, and optimal efficiency;
   operative if said unassigned data storage device can be used to restore a degraded storage array comprising degraded reliability, degraded performance, and degraded efficiency, to optimal reliability, optimal performance, and optimal efficiency, reconfiguring said degraded array comprising degraded reliability, degraded performance, and degraded efficiency to comprise said unassigned data storage device;
   operative if said unassigned data storage device cannot be used to restore a degraded storage array comprising degraded reliability, degraded performance, and degraded efficiency, to optimal reliability, optimal performance, and optimal efficiency, determining if said unassigned data storage device can be used to restore a degraded storage array comprising optimal reliability, degraded performance, and degraded efficiency, to optimal reliability, optimal performance, and optimal efficiency;
   operative if said unassigned data storage device can be used to restore a degraded storage array comprising optimal reliability, degraded performance, and degraded efficiency, to optimal reliability, optimal performance, and optimal efficiency, reconfiguring said degraded array comprising optimal reliability, degraded performance, and degraded efficiency to comprise said unassigned data storage device.

2. The method of claim 1, further comprising the steps of:
   operative if said unassigned data storage device cannot be used to restore a degraded storage array comprising optimal reliability, degraded performance, and degraded efficiency, to optimal reliability, optimal performance, and optimal efficiency, determining if said unassigned data storage device can be used to restore a degraded storage array comprising degraded reliability, optimal performance, and degraded efficiency, to optimal reliability, optimal performance, and optimal efficiency;

operative if said unassigned data storage device can be used to restore a degraded storage array comprising degraded reliability, optimal performance, and degraded efficiency, to optimal reliability, optimal performance, and optimal efficiency, reconfiguring said degraded array comprising degraded reliability, optimal performance, and degraded efficiency to comprise said unassigned data storage device;

operative if said unassigned data storage device cannot be used to restore a degraded storage array comprising degraded reliability, optimal performance, and degraded efficiency, to optimal reliability, optimal performance, and optimal efficiency, determining if said unassigned data storage device can be used to restore a degraded storage array comprising optimal reliability, optimal performance, and degraded efficiency, to optimal reliability, optimal performance, and optimal efficiency;

operative if said unassigned data storage device can be used to restore a degraded storage array comprising optimal reliability, optimal performance, and degraded efficiency, to optimal reliability, optimal performance, and optimal efficiency, reconfiguring said degraded storage array comprising optimal reliability, optimal performance, and degraded efficiency to comprise said unassigned data storage device.

3. The method of claim 2, further comprising the steps of:

operative if said unassigned data storage device cannot be used to restore a degraded storage array to optimal reliability, optimal performance, and optimal efficiency, determining if said unassigned data storage device can be used to increase the performance and/or the reliability and/or the efficiency of a degraded storage array comprising degraded reliability, degraded performance, and degraded efficiency;

operative if said unassigned data storage device can be used to increase the performance and/or the reliability and/or the efficiency of a degraded storage array comprising degraded reliability, degraded performance, and degraded efficiency, reconfiguring said degraded storage array comprising degraded reliability, degraded performance, and degraded efficiency to include said unassigned data storage device;

operative if said unassigned data storage device cannot be used to increase the performance and/or the reliability and/or the efficiency of a degraded storage array comprising degraded reliability, degraded performance, and degraded efficiency, determining if said unassigned data storage device can be used to increase the performance and/or efficiency of a degraded storage array comprising optimal reliability, degraded performance, and degraded efficiency;

operative if said unassigned data storage device can be used to increase the performance and/or efficiency of a degraded storage array comprising optimal reliability, degraded performance, and degraded efficiency, reconfiguring to comprise said unassigned data storage device said degraded storage array comprising optimal reliability, degraded performance, and degraded efficiency.

4. The method of claim 3, further comprising the steps of:

operative if said unassigned data storage device cannot be used to increase the performance and/or efficiency of a degraded storage array comprising optimal reliability, degraded performance, and degraded efficiency, determining if said unassigned data storage device can be used to increase the reliability and/or the efficiency of a degraded storage array comprising degraded reliability, optimal performance, and degraded efficiency;

operative if said unassigned data storage device can be used to increase the reliability and/or the efficiency of a degraded storage array comprising degraded reliability, optimal performance, and degraded efficiency, reconfiguring said degraded storage array comprising degraded reliability, optimal performance, and degraded efficiency to include said unassigned data storage device;

operative if said unassigned data storage device cannot be used to increase the reliability and/or the efficiency of a degraded storage array comprising degraded reliability, optimal performance, and degraded efficiency, determining if said unassigned data storage device can be used to increase the efficiency of a degraded storage array comprising optimal reliability, degraded efficiency, and optimal performance;

operative if said unassigned data storage device can be used to increase the efficiency of a degraded storage array comprising optimal reliability, degraded efficiency, and optimal performance, reconfiguring said degraded storage array comprising optimal reliability, degraded performance to include said unassigned data storage device.

5. An article of manufacture comprising information storage medium having computer readable program code disposed therein to reconfigure a storage array disposed in a data storage system comprising a plurality of data storage devices, wherein each of said plurality of data storage devices is assigned to one of a plurality of data storage arrays, or is assigned as a spare data storage device, the computer readable program code comprising a series of computer readable program steps to effect:

detecting an unassigned data storage device;

determining if any of said plurality of data storage arrays comprises a degraded data storage array;

operative if none of said plurality of data storage arrays comprises a degraded data storage array, designating said unassigned data storage device as a spare data storage device;

operative if any of said plurality of data storage arrays comprises a degraded data storage array, determining if said unassigned data storage device can be used to restore said degraded data storage array to optimal reliability, optimal performance, and optimal efficiency;

operative if said unassigned data storage device can be used restore said degraded array to an array comprising optimal reliability, optimal performance, and optimal efficiency, reconfiguring said degraded data storage array to comprise said unassigned data storage device;

operative if said unassigned data storage device cannot be used to restore a degraded array to optimal reliability, optimal performance, and optimal efficiency, determining if said unassigned data storage device can be used to increase the reliability, performance, or efficiency of a degraded data storage array;

operative if said unassigned data storage device can be used to increase the reliability, performance, or efficiency of said degraded data storage array, reconfiguring said degraded data storage array to comprise said unassigned data storage device;

operative if said unassigned data storage device cannot be used to restore a degraded storage array comprising degraded reliability, degraded performance, and degraded efficiency, to optimal reliability, optimal performance, and optimal efficiency, determining if said unassigned data storage device can be used to restore a degraded storage array comprising optimal reliability, degraded performance, and degraded efficiency, to optimal reliability, optimal performance, and optimal efficiency;

operative if said unassigned data storage device can be used to restore a degraded storage array comprising optimal reliability, degraded performance, and degraded efficiency, to optimal reliability, optimal performance, and optimal efficiency, reconfiguring said degraded array comprising optimal reliability, degraded performance, and degraded efficiency to comprise said unassigned data storage device.

6. The article of manufacture of claim 5, said computer readable program code further comprising a series of computer readable program steps to effect:

operative if said unassigned data storage device cannot be used to restore a degraded storage array comprising optimal reliability, degraded performance, and degraded efficiency, to optimal reliability, optimal performance, and optimal efficiency, determining if said unassigned data storage device can be used to restore a degraded storage array comprising degraded reliability, optimal performance, and degraded efficiency, to optimal reliability, optimal performance, and optimal efficiency;

operative if said unassigned data storage device can be used to restore a degraded storage array comprising degraded reliability, optimal performance, and degraded efficiency, to optimal reliability, optimal performance, and optimal efficiency, reconfiguring said degraded array comprising degraded reliability, optimal performance, and degraded efficiency to comprise said unassigned data storage device;

operative if said unassigned data storage device cannot be used to restore a degraded storage array comprising degraded reliability, optimal performance, and degraded efficiency, to optimal reliability, optimal performance, and optimal efficiency, determining if said unassigned data storage device can be used to restore a degraded storage array comprising optimal reliability, optimal performance, and degraded efficiency, to optimal reliability, optimal performance, and optimal efficiency;

operative if said unassigned data storage device can be used to restore a degraded storage array comprising optimal reliability, optimal performance, and degraded efficiency, to optimal reliability, optimal performance, and optimal efficiency, reconfiguring said degraded storage array comprising optimal reliability, optimal performance, and degraded efficiency to comprise said unassigned data storage device.

7. The article of manufacture of claim 6, said computer readable program code further comprising a series of computer readable program steps to effect:

operative if said unassigned data storage device cannot be used to restore a degraded storage array to optimal reliability, optimal performance, and optimal efficiency, determining if said unassigned data storage device can be used to increase the performance and/or the reliability and/or the efficiency of a degraded storage array comprising degraded reliability, degraded performance, and degraded efficiency;

operative if said unassigned data storage device can be used to increase the performance and/or the reliability and/or the efficiency of a degraded storage array comprising degraded reliability, degraded performance, and degraded efficiency, reconfiguring said storage array comprising degraded reliability, degraded performance, and degraded efficiency to include said unassigned data storage device;

operative if said unassigned data storage device cannot be used to increase the performance and/or the reliability and/or the efficiency of a degraded storage array comprising degraded reliability, degraded performance, and degraded efficiency, determining if said unassigned data storage device can be used to increase the performance and/or efficiency of a degraded storage array comprising optimal reliability, degraded performance, and degraded efficiency;

operative if said unassigned data storage device can be used to increase the performance and/or efficiency of a degraded storage array comprising optimal reliability, degraded performance, and degraded efficiency, reconfiguring to comprise said unassigned data storage device said degraded storage array comprising optimal reliability, degraded performance, and degraded efficiency.

8. The article of manufacture of claim 7, said computer readable program code further comprising a series of computer readable program steps to effect:

operative if said unassigned data storage device cannot be used to increase the performance and/or efficiency of a degraded storage array comprising optimal reliability, degraded performance, and degraded efficiency, determining if said unassigned data storage device can be used to increase the reliability and/or the efficiency of a degraded storage array comprising degraded reliability, optimal performance, and degraded efficiency;

operative if said unassigned data storage device can be used to increase the reliability and/or the efficiency of a degraded storage array comprising degraded reliability, optimal performance, and degraded efficiency, reconfiguring said degraded storage array comprising degraded reliability, degraded performance, and optimal performance to include said unassigned data storage device;

operative if said unassigned data storage device cannot be used to increase the reliability and/or the efficiency of a degraded storage array comprising degraded reliability, optimal performance, and degraded efficiency, determining if said unassigned data storage device can be used to increase the efficiency of a degraded storage array comprising optimal reliability, degraded efficiency, and optimal performance;

operative if said unassigned data storage device can be used to increase the efficiency of a degraded storage array comprising optimal reliability, degraded efficiency, and optimal performance, reconfiguring said degraded storage array comprising optimal reliability, degraded efficiency, and optimal performance to include said unassigned data storage device.

9. A computer program product encoded in an information storage medium and usable with a programmable computer processor to reconfigure a storage array disposed in a data storage system comprising a plurality of data storage devices, wherein each of said plurality of data storage devices is assigned to one of a plurality of data storage arrays, or is assigned as a spare data storage device, comprising:

computer readable program code which causes said programmable computer processor to detect an unassigned data storage device;

computer readable program code which causes said programmable computer processor to determine if any of said plurality of data storage arrays comprises a degraded data storage array;

computer readable program code which, if none of said plurality of data storage arrays comprises a degraded data storage array, causes said programmable computer processor to designate said unassigned data storage device as a spare data storage device;

computer readable program code which, if any of said plurality of data storage arrays comprises a degraded data storage array, causes said programmable computer processor to determine if said unassigned data storage device can be used to restore said degraded data storage array to optimal reliability, optimal performance, and optimal efficiency;

computer readable program code which, if said unassigned data storage device can be used restore said degraded array to an array comprising optimal reliability, optimal performance, and optimal efficiency, causes said programmable computer processor to reconfigure said degraded data storage array to comprise said unassigned data storage device;

computer readable program code which, if said unassigned data storage device cannot be used to restore a degraded array to optimal reliability, optimal performance, and optimal efficiency, causes said programmable computer processor to determine if said unassigned data storage device can be used to increase the reliability, performance, or efficiency of a degraded data storage array;

computer readable program code which, if said unassigned data storage device can be used to increase the reliability, performance, or efficiency of said degraded data storage array, causes said programmable computer processor to reconfigure said degraded data storage array to comprise said unassigned data storage device;

computer readable program code which, if said unassigned data storage device cannot be used to restore a degraded storage array comprising degraded reliability, degraded performance, and degraded efficiency, to optimal reliability, optimal performance, and optimal efficiency, causes said programmable computer processor to determine if said unassigned data storage device can be used to restore a degraded storage array comprising optimal reliability, degraded performance, and degraded efficiency, to optimal reliability, optimal performance, and optimal efficiency;

computer readable program code which, if said unassigned data storage device can be used to restore a degraded storage array comprising optimal reliability, degraded performance, and degraded efficiency, to optimal reliability, optimal performance, and optimal efficiency, causes said programmable computer processor to reconfigure said degraded array comprising optimal reliability, degraded performance, and optimal efficiency to comprise said unassigned data storage device.

10. The computer program product of claim 9, further comprising:

computer readable program code which, if said unassigned data storage device cannot be used to restore a degraded storage array comprising optimal reliability, degraded performance, and degraded efficiency, to optimal reliability, optimal performance, and optimal efficiency, causes said programmable computer processor to determine if said unassigned data storage device can be used to restore a degraded storage array comprising degraded reliability, optimal performance, and degraded efficiency, to optimal reliability, optimal performance, and optimal efficiency;

computer readable program code which, if said unassigned data storage device can be used to restore a degraded storage array comprising degraded reliability, optimal performance, and degraded efficiency, to optimal reliability, optimal performance, and optimal efficiency, causes said programmable computer processor to reconfigure said degraded array comprising degraded reliability, optimal performance, and degraded efficiency to comprise said unassigned data storage device;

computer readable program code which, if said unassigned data storage device cannot be used to restore a degraded storage array comprising degraded reliability, optimal performance, and degraded efficiency, to optimal reliability, optimal performance, and optimal efficiency, causes said programmable computer processor to determine if said unassigned data storage device can be used to restore a degraded storage array comprising optimal reliability, optimal performance, and degraded efficiency, to optimal reliability, optimal performance, and optimal efficiency;

computer readable program code which, if said unassigned data storage device can be used to restore a degraded storage array comprising optimal reliability, optimal performance, and degraded efficiency, to optimal reliability, optimal performance, and optimal efficiency, causes said programmable computer processor to reconfigure said degraded storage array comprising optimal reliability, optimal performance, and degraded efficiency to comprise said unassigned data storage device.

11. The computer program product of claim 10, further comprising:

computer readable program code which, if said unassigned data storage device cannot be used to restore a degraded storage array to optimal reliability, optimal performance, and optimal efficiency, causes said programmable computer processor to determine if said unassigned data storage device can be used to increase the performance and/or the reliability and/or efficiency of a degraded storage array comprising degraded reliability, degraded performance, and degraded efficiency;

computer readable program code which, if said unassigned data storage device can be used to increase the performance and/or the reliability and/or efficiency of a degraded storage array comprising degraded reliability, degraded performance, and degraded efficiency, causes said programmable computer processor to reconfigure said degraded storage array comprising degraded reliability, degraded performance, and degraded efficiency to include said unassigned data storage device;

computer readable program code which, if said unassigned data storage device cannot be used to increase the performance and/or the reliability and/or the efficiency of a degraded storage array comprising degraded reliability, degraded performance, and degraded efficiency, causes said programmable computer processor to determine if said unassigned data storage device can be used to increase the performance and/or the efficiency of a degraded storage array comprising optimal reliability, degraded performance, and degraded efficiency;

computer readable program code which, if said unassigned data storage device can be used to increase the performance and/or the efficiency of a degraded storage array comprising optimal reliability, degraded performance, and degraded efficiency, causes said programmable computer processor to reconfigure said degraded storage array comprising optimal reliability, degraded performance, and degraded efficiency to comprise said unassigned data storage device.

12. The computer program product of claim 11, further comprising:

computer readable program code which, if said unassigned data storage device cannot be used to increase the performance and/or the efficiency of a degraded storage array comprising optimal reliability, degraded performance, and degraded efficiency, causes said programmable computer processor to determine if said unassigned data storage device can be used to increase the reliability and/or the efficiency of a degraded storage array comprising degraded reliability, optimal performance, and degraded efficiency;

computer readable program code which, if said unassigned data storage device can be used to increase the reliability and/or the efficiency of a degraded storage array comprising degraded reliability, optimal performance, and degraded efficiency, causes said programmable computer processor to reconfigure said degraded storage array comprising degraded reliability, optimal performance, and degraded efficiency to include said unassigned data storage device;

computer readable program code which, if said unassigned data storage device cannot be used to increase the reliability and/or the efficiency of a degraded storage array comprising degraded reliability, optimal performance, and degraded efficiency, causes said programmable computer processor to determine if said unassigned data storage device can be used to increase the efficiency of a degraded storage array comprising optimal reliability, degraded efficiency, and optimal performance;

computer readable program code which, if said unassigned data storage device can be used to increase the efficiency of a degraded storage array comprising optimal reliability, degraded efficiency, and optimal performance, causes said programmable computer processor to reconfigure said degraded storage array comprising optimal reliability, degraded performance to include said unassigned data storage device.

* * * * *